United States Patent [19]

Nozawa et al.

[11] Patent Number: 4,642,985
[45] Date of Patent: Feb. 17, 1987

[54] OIL PUMP SYSTEM IN POWER TRAIN

[75] Inventors: Koji Nozawa, Higashikurume; Yukio Mizukoshi, Yokohama, both of Japan

[73] Assignee: Nissan Motor Company, Limited, Japan

[21] Appl. No.: 744,691

[22] Filed: Jun. 14, 1985

[30] Foreign Application Priority Data

Jun. 15, 1984 [JP] Japan .............................. 59-88254[U]

[51] Int. Cl.$^4$ ........................ F16D 31/02; F16D 13/60
[52] U.S. Cl. .................................... 60/435; 192/113 B
[58] Field of Search ........... 192/113 B, 110 R, 110 B, 192/61; 60/435–442

[56] References Cited

U.S. PATENT DOCUMENTS

| | | | |
|---|---|---|---|
| 3,249,189 | 5/1966 | Schjolin et al. | 192/113 B X |
| 3,334,717 | 8/1967 | Spokas et al. | 192/113 B |
| 3,452,848 | 7/1969 | Brunner | 192/113 B |
| 3,695,407 | 10/1972 | Peery | 192/113 B |

FOREIGN PATENT DOCUMENTS 975377 11/1961 Fed. Rep. of Germany ... 192/113 B 5042150 4/1975 Japan .

Primary Examiner—Edward K. Look
Attorney, Agent, or Firm—Leydig, Voit & Mayer

[57] ABSTRACT

An inventive oil pump system in a power train has a simple oil-delivery arrangement employing a hollow torque-input member containing a member to which oil is to be delivered, a drive shaft extending from the interior of the torque-input member and capable of being rotated by the torque-input member, an oil pump disposed coaxially with the drive shaft, a sleeve fixed to the oil pump and coaxially surrounding the drive shaft, a hollow pump-drive shaft coaxially surrounding the drive shaft, being journalled within the sleeve thus forming an oil-discharge passageway surrounding the drive shaft, and a coupling comprising a non-circular opening in the torque-input member and one end of the pump-drive shaft being inserted into the opening, the end of the pump-drive shaft having a non-circular cross-section capable of engaging the walls of the opening while leaving some radial clearance between part of the walls of the opening and the outer surface of the end of the pump-drive shaft.

19 Claims, 5 Drawing Figures

OIL PUMP SYSTEM IN POWER TRAIN

BACKGROUND OF THE INVENTION

1. Field of the Invention

This invention relates to an oil pump system in a power train and more particularly to an oil pump system in an automotive power train.

2. Description of the Prior Art

Generally, an automotive wet-plate-type clutch includes a lubricating oil pump system for lubricating friction facings of a clutch disc. For example, Japanese published unexamined utility model application No. 50-42150 presented a lubricating oil pump system comprising an oil pump disposed remote from a clutch shaft, an axial lubricating oil passageway encircling the clutch shaft, a connecting lubricating oil passageway between an outlet of the lubricating oil pump and an inlet of the lubricating oil passageway, and a clutch cover accommodating a clutch disc. The lubricating oil ejected from an outlet of the axial lubricating oil passageway lubricates the facings of the clutch disc.

The connecting lubricating oil passageway of this prior art lubricating oil pump system requires oil seals, and even so may leak lubricant. Additionally, the labor required to machine and assemble the connecting lubricating oil passageway decreases the overall efficiency of wet-plate-type clutch assembly and increases the manufacturing cost of the clutch.

SUMMARY OF THE INVENTION

A primary object of this invention is to provide an oil pump system in a power train having a simple oil-delivery arrangement. In order to achieve this object, an inventive oil pump system in a power train comprises a hollow torque-input member surrounding a member to which oil is to be delivered, a drive shaft extending from the interior of the torque-input member and capable of being rotated by the torque-input member, an oil pump having a casing coaxial with the drive shaft, a hollow pump-drive shaft coaxially surrounding the drive shaft with a clearance defined therebetween, one end of the pump-drive shaft driving the oil pump and opening into an oil-discharge chamber of the oil pump, the other end of the pump-drive shaft being driven by the torque-input member and opening into the interior of the torque-input member, the clearance forming an oil-discharge passageway between the oil-discharge chamber and the interior of the torque-input member, a sleeve fixed to the casing of the oil pump and surrounding the pump-drive shaft, the sleeve rotatably bearing the pump-drive shaft, and a coupling for rotating the torque-input member and the pump-drive shaft together, the coupling comprising a non-circular opening formed in the torque-input member and the opposing end of the pump-drive shaft, the latter having a non-circular cross section and being inserted into the opening with a radial clearance remaining between the edges of the opening and the outer surface of said end of the pump-drive shaft.

According to this invention, the arrangement of the oil pump system in alignment with the drive shaft obviates the need for a connecting passageway between an oil pump remote from the drive shaft and the oil-discharge passageway surrounding the drive shaft, and the radial clearance cancels the possible adverse effects of eccentricities or uneven rotation of the torque-input member, thus ensuring smooth rotation of the pump-drive shaft and the oil pump.

DESCRIPTION OF THE PREFERRED EMBODIMENTS

The preferred embodiments of this invention will be described with reference to FIGS. 1 to 5.

Figure 1:
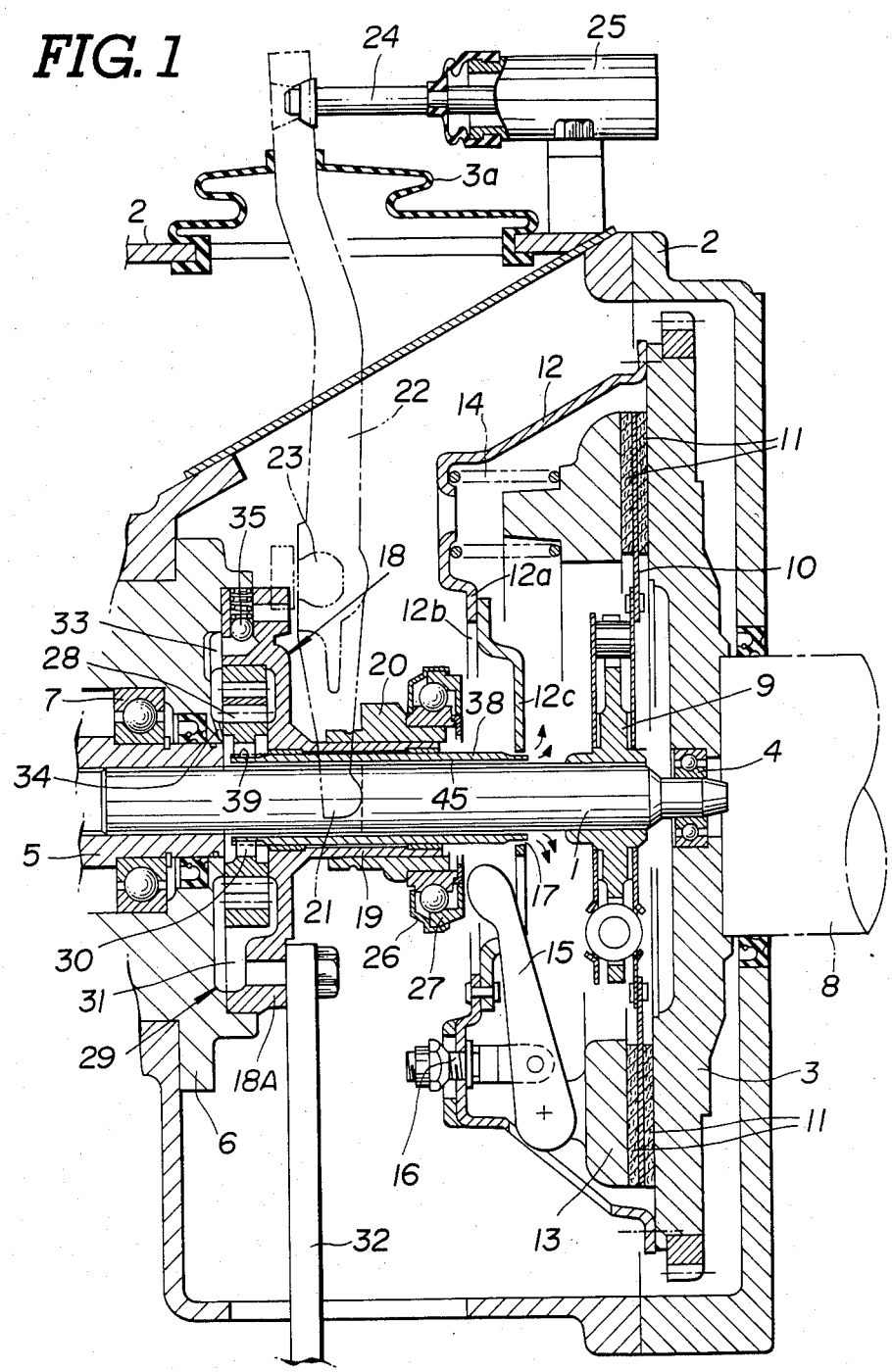
FIG. 1 is a longitudinal section through a lubricating oil pump system in an automotive wet-plate-type clutch according to an embodiment of this invention.

An automotive wet-plate-type clutch shown in FIG. 1 includes an oil pump system according to an embodiment of this invention.

A splined clutch shaft 1 is journalled within a sealed clutch housing 2. A small-diameter, engine-side end of the clutch shaft 1 is journalled on a flywheel 3 by means of a bearing 4. A splined transmission shaft 5 meshing with the transmission-side end of the clutch shaft 1 is journalled on a transmission-side clutch housing cover 6 by means of a bearing 7. The flywheel 3 is fixed to one end of an engine crankshaft 8.

A splined hub 9 of a clutch disc 10 meshes with the clutch shaft 1 near its engine-side end, so that the clutch disc 10 is free to move axially along the clutch shaft 1. Both surfaces of the clutch disc 10 have friction facings 11. An engine-side flange of a clutch cover 12 is fixed to the edge of the transmission-side surface of the flywheel 3. The clutch cover 12 accommodates the clutch disc 10, a pressure plate 13 engaging or disengaging from the friction facings 11, a plurality of pressure springs 14 and a plurality of release levers 15 each pivotably mounted on the pressure plate 13 and supported by an eyebolt fulcrum 16. The transmission-side portion 12a of the clutch cover 12 has a central aperture 12b and a central clutch cover element 12c fixed to the edges of the central aperture 12b. The central clutch cover element 12c includes a central non-circular aperture 17 best shown in FIG. 3. When the clutch is applied, the pressure plate 13 clamps the friction facings 11 to the flywheel 3 and the clutch disc 10 drives the clutch shaft 1 to rotate.

A front pump casing cover 18A of a lubricating oil pump 18 is fixed to the inner side of the transmission-side clutch housing cover 6 and coaxially surround the clutch shaft 1. The front pump casing cover 18A includes a cylindrical-pump-drive-shaft bearing or sleeve 19 extending along the clutch shaft 1 to near the transmission-side portion 12a of the clutch cover 12. A release bearing sleeve 20 slidably surrounds the outside of the sleeve 19 of the front pump casing cover 18A. A transmission-side face of the release bearing sleeve 20 engages the operating end 21 of a withdrawal lever 22 which, in turn, is pivotably supported by a spherical fulcrum 23 fixed to the clutch housing 2. The withdrawal lever 22 is directly operated by a piston rod 24 of an actuating cylinder 25 hydraulically connected to a master cylinder (not shown) controlled by a clutch pedal (not shown). A dust-tight rubber boot 3a encircling the withdrawal lever 22 seals the clutch housing 2 off from the actuating cylinder 25.

A release bearing 26 is fixedly mounted on the engine-side end of the release bearing sleeve 20. The engine-side end face of the outer race 27 of the release bearing 26 can slidably engages the free ends of all of the release levers 15 rotating together with the flywheel 3. When the driver depresses the clutch pedal, the piston rod 24 pushes the withdrawal lever 22 to the left in FIG. 1 so that the operating end 21 of the withdrawal lever 22 pushes the release bearing sleeve 20 to the right in FIG. 1. The end face of the outer race 27 of the release bearing 26 thus pushes the free ends of the release levers 15 to the right in FIG. 1. The release levers 15 move the pressure plate 13 to the left in FIG. 1 against the biasing force of the pressure springs 14, thus separating the facings 11 from the flywheel 3 to release the clutch.

The lubricating oil pump 18 is a kind of gear pump and includes a pump drive gear 28 within a working chamber 29 defined by the transmission-side clutch housing cover 6 and the front pump casing cover 18A. The pump drive gear 28 has a splined inner-diameter portion 30 defining a central hole encircling the clutch shaft 1. The working chamber 29 includes a suction chamber 31 connected to a suction pipe 32 which, in turn, is connected to a lubricating oil reservoir (not shown) and also includes a discharge chamber 33 hydraulically connected to the central hole in the splined inner-diameter portion 30 via a connecting passageway 34 through the transmission-side clutch housing cover 6. The lubricating oil pump 18 has a relief valve 35 which can relieve excessive pressure generated due to high-speed rotation of the engine.

Figure 2:
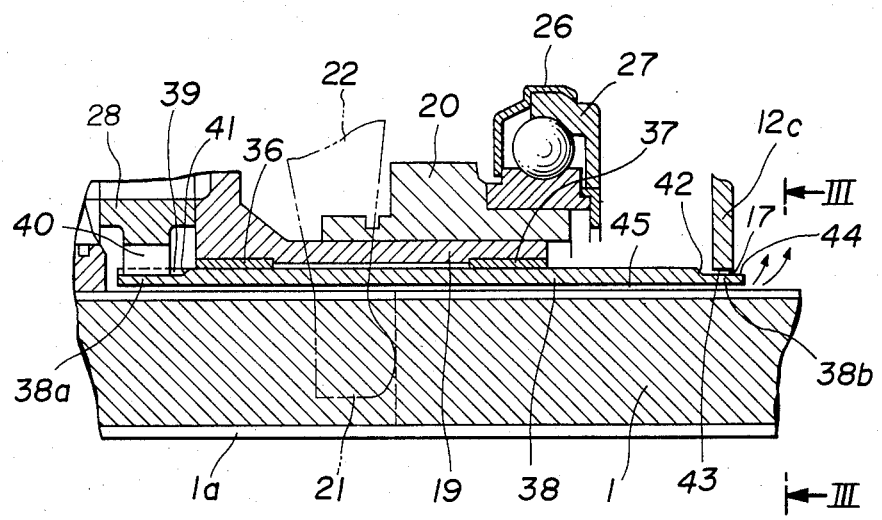
FIG. 2 is an enlarged longitudinal section through a major portion of the lubricating oil pump system shown in FIG. 1.

As is best shown in FIG. 2, a bushing 36 fits within the inner surface of the inner end of the sleeve 19 and a bushing 37 fits within the inner surface of the outer end of the sleeve 19. Both bushings 36 and 37 serve as plain bearings.

A hollow cylindrical pump-gear-drive shaft 38 coaxially surrounding the clutch shaft 1 is journalled on the bushings 36 and 37 and is free to rotate independently of the clutch shaft 1. One end 38a of the pump-gear-drive shaft 38 passing through the central hole of the pump drive gear 28 has splines 39 meshing with the splines 40 defining the central hole of the pump drive gear 28. Keyways adjoining the splines 39 terminate at shoulders 41 capable of abutting the front edge of the splines 40 of the pump drive gear 28 in order to limit left-ward axial movement of the pump-gear-drive shaft 38 as viewed in FIG. 2.

Alternatively, the inner-diameter portion of the pump drive gear 28 and the opposing end 38a of the pump-gear-drive shaft may form a different sort of key-and-keyway coupling.

Figure 3:
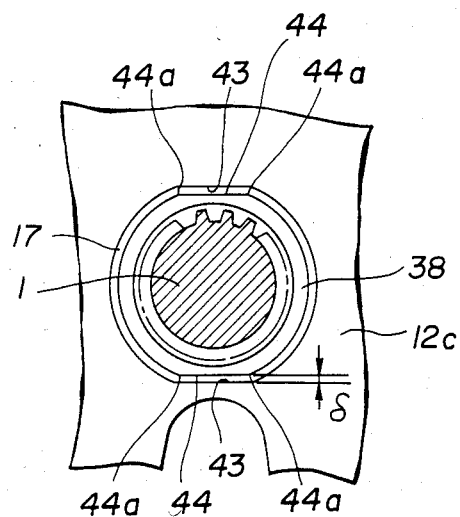
FIG. 3 is a cross-sectional view taken along the line III—III in FIG. 2.

The other end 38b of the pump-gear-drive shaft 38 passing through the central aperture 17 of the central clutch cover element 12c has a non-circular cross-section similar to that of the central aperture 17 as shown in FIG. 3. The outer diameter of the major part of the pump-gear-drive shaft 38 is larger than the diameter of the central aperture 17. A shoulder 42 is formed at the junction between the other end 38b with the non-circular cross-section and the major part of the pump-gear-drive shaft 38. The shoulder 42 is capable of abutting the central clutch cover element 12c in order to limit axial movement of the pump-gear-drive shaft 38 to the right in FIG. 2.

As shown in FIG. 3, the central aperture 17 in the central clutch cover element 12c has an incomplete-circular cross-section including a pair of opposing flats 43 and the cross-section of the engine-side end 38b of the pump-gear-drive shaft 38 matches the contours of the central aperture 17. Specifically, the engine-side end 38b has a pair of flats 44 opposing the flats 43 of the central aperture 17 across a radial clearance δ. The two edges 44a of each flat 44 of the pump-gear-drive shaft 38 are capable of abutting the opposing flat 43 of the central aperture 17 during rotation so that the clutch cover 12 and the pump-gear-drive shaft 38 rotate together.

Alternatively, the engine-side end of the pump-gear-drive shaft and the central clutch cover element may form an axial key-and-keyway coupling or other sort of coupling with sufficient radial clearance.

A lubricating oil discharge passageway 45 is defined around the clutch shaft 1 by the hollow pump-gear-drive shaft 38. The keyways adjoining the splines 1a on the cylindrical surface of the clutch shaft 1 facilitate the smooth flow of the lubricating oil through the discharge passageway 45.

The operation of the lubricating oil pump system of this invention will be described hereafter.

As the engine runs, the engine crankshaft 8, the flywheel 3, the clutch cover 12, the central clutch cover element 12c, the pump-gear-drive shaft 38 and the pump drive gear 28 all rotate together. The engine-side end 38b of the pump-drive-shaft 38 continuously discharges lubricating oil into the interior of the clutch cover 12 and so lubricates the friction facings 11 of the clutch disc 10. The flats 43 of the central aperture 17 in the central clutch cover element 12c abut the edges 44a of the flats 44 of the pump-gear-drive shaft 38 during rotation. The clearance δ between the flats 43 and 44 cancels any adverse effects due to eccentric mounting or slight radial asymmetries of the clutch cover 12, thus preventing unbalanced load and excessive wear on the pump-gear-drive shaft 38 and the pump-drive shaft bearing 19. The bushings 36 and 37 ensure accurate alignment of the pump-gear-drive shaft 38 and the clutch shaft 1.

Figure 4:
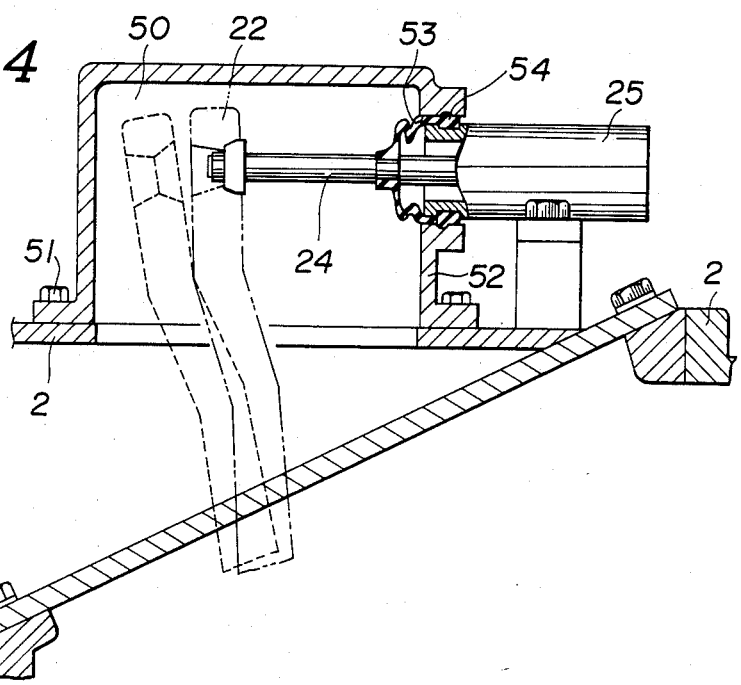
FIG. 4 is a partial cross-sectional view of a modification to a dust-tight structure for a clutch housing surrounding a withdrawal lever.

FIG. 4 illustrates a modification to the dust-tight closure of the clutch cover 2 around the withdrawal lever 22. This dust-tight structure comprises a withdrawal lever cover box 50 made of metal instead of the dust-tight rubber boot 3a shown in FIG. 1. The withdrawal lever cover box 50 is fixed to the clutch cover 2 by bolts 51. One side 52 of the withdrawal lever cover box 50 has an opening 53 accommodating one end of the actuating cylinder 25. A cup-shaped rubber boot 54 functions as an oil seal for the opening 53.

Figure 5:
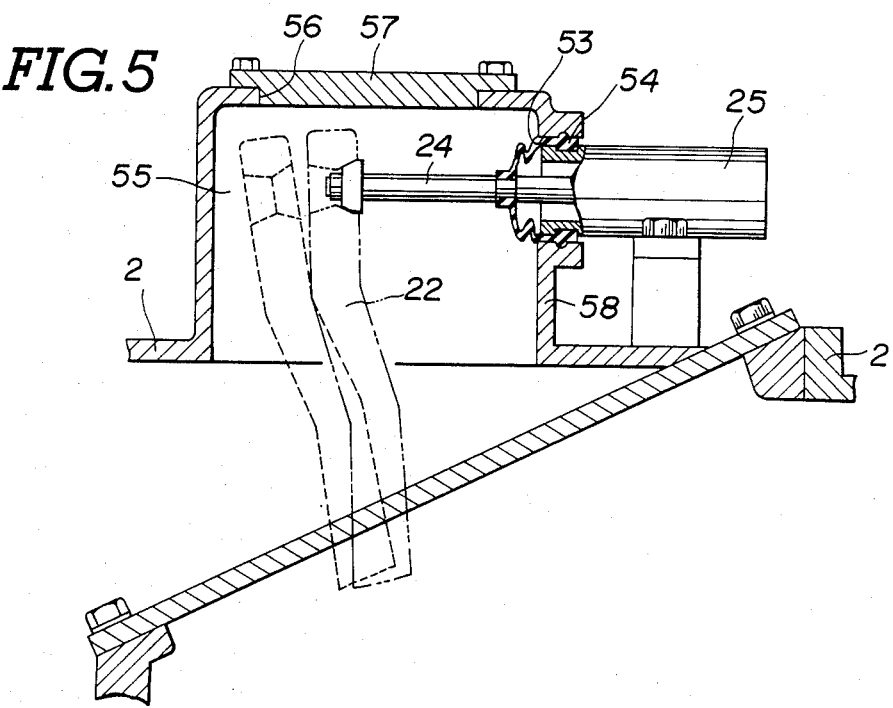
FIG. 5 is a partial cross-sectional view of other modification to the dust-tight structure for a clutch housing surrounding a withdrawal lever.

FIG. 5 illustrates another modification to the dust-tight structure of the clutch housing 2 around the withdrawal lever 22. This dust-tight structure comprises a withdrawal lever cover box 55 with an upper opening 56 formed integrally with the clutch housing 2 and a cover plate 57 sealing the upper opening 56 in place of the dust-tight rubber boot 3a shown in FIG. 1. The withdrawal lever 22 is accessible through the upper opening 56 when the cover plate 57 is removed. One side 58 of the withdrawal lever cover box 55 has an opening 53 for the operating end of the actuating cylinder 25.

These modifications improve the performance, and the durability of the dust-tight structure of the clutch housing 2 while reducing the labor required for its assembly.

This invention is also applicable to a lubricating oil pump system in a torque converter of an automatic transmission which includes a lubricating oil pump coaxially surrounding a torque-input shaft and driven by a converter cover to discharge lubricant into the converter cover.

What is claimed is:

1. An oil pump system in a power train, comprising:
   a hollow torque-input member accommodating a member to which oil is to be delivered;
   a drive shaft extending from the interior of said torque-input member and capable of being rotated by said torque-input member;
   an oil pump having a casing coaxial with said drive shaft;
   a hollow pump-drive shaft coaxially surrounding said drive shaft with a rotatable clearance defined therebetween, one end of said pump-drive shaft driving said oil pump and opening into an oil-discharge chamber of said oil pump, the other end of said pump-drive shaft being driven by said torque-input member and opening into the interior of said torque-input member, the clearance forming an oil-discharge passageway between the oil-discharge chamber and the interior of said torque-input member;
   a sleeve fixed to the casing of said oil pump and surrounding said pump-drive shaft, the sleeve rotatably bearing said pump-drive shaft; and
   means for rotatably coupling said torque-input member and said pump-drive shaft, said coupling means comprising an opening formed in said torque-input member and said other end of said pump-drive shaft fitted within the opening, said other end of said pump-drive shaft having radial clearance from part of the edges of the opening.

2. An oil pump system in a power train as recited in claim 1, wherein the edges of the opening have a first flat and said other end of said pump-drive shaft has a second flat, one edge of which abuts the first flat as the pump-drive shaft rotates.

3. An oil pump system in a power train as recited in claim 1, wherein the edges of the opening have a pair of first diametrically opposing flats and said other end of said pump-drive shaft has a pair of second diametrically opposing flats, one edge of each of said second flats engaging the opposing first flat as said pump-drive shaft rotates.

4. An oil pump system in a power train as recited in claim 1, wherein said sleeve has a fixed bushing and the outer surface of the pump-drive shaft slides along the inner surface of the bushing.

5. An oil pump system in a power train as recited in claim 1, wherein said drive shaft has a spline on its cylindrical surface opposing the inner surface of said pump-drive shaft.

6. An oil pump system in a power train as recited in claim 1, wherein said oil pump is a gear pump including a pump drive gear with an inner portion including a splined central hole, and said one end of said pump-drive shaft has a spline by which it couples with the splined central hole.

7. An oil pump system in a power train as recited in claim 1, wherein said sleeve is formed integrally with the casing of said oil pump.

8. An oil pump system in a power train as recited in claim 6, wherein said one end of said pump-drive shaft has a shoulder capable of abutting a corresponding surface of the inner portion, the shoulder limitting axial movement of said pump-drive shaft.

9. An oil pump system in a power train as recited in claim 2, wherein the outer surface of said other end of said pump-drive shaft has a shoulder opposing the second flat and capable of abutting an opposing outer surface of the torque-input member, the shoulder limitting axial movement of said pump-drive shaft.

10. An oil pump system in a clutch, comprising:
    a hollow clutch cover accommodating a facing of a clutch disc to be lubricated with oil;
    a clutch shaft extending from the interior of the clutch cover and capable of coupling with or uncoupling from said clutch cover;
    a lubricating oil gear pump disposed coaxially with said drive shaft and having a pump drive gear;
    a rotatable hollow pump-drive shaft coaxially surrounding said clutch shaft with a clearance defined therebetween, one end of said pump-drive shaft driving the pump drive gear and opening into an oil-discharge chamber of said lubricating oil gear pump, the other end of said pump-drive shaft being driven by said clutch cover and opening into the interior of said clutch cover, the clearance forming an oil-discharge passageway between the oil-discharge chamber and the interior of said clutch cover;
    a sleeve fixed to the casing of said lubricating oil gear pump and surrounding said pump-drive shaft, the sleeve rotatably bearing said pump-drive shaft; and
    means for rotatably coupling said clutch cover and said pump-drive shaft, said coupling means comprising an opening formed in said clutch cover and said other end of said pump-drive shaft fitted within the opening, said other end of said pump-drive shaft having radial clearance from part of the edges of the opening.

11. An oil pump system in a power train as recited in claim 1, wherein the radial clearance permits said torque input member to radially move relative to said other end of said pump drive shaft.

12. An oil pump system in a power train as recited in claim 11, wherein the edges of the opening have a first flat and said other end of said pump drive shaft has a second flat, one edge of which abuts the first flat as the pump drive shaft rotates.

13. An oil pump system in a power train as recited in claim 11, wherein the edges of the opening have a pair of first diametrically opposing flats and said other end of said pump drive shaft has a pair of second diametrically opposing flats, one edge of each of said second flats engaging the opposing first flats as said pump drive shaft rotates.

14. An oil pump system in a power train as recited in claim 11, wherein said sleeve has a fixed bushing and the outer surface of the pump drive shaft slides along the inner surface of the bushing.

15. An oil pump system in a power train as recited in claim 11, wherein said drive shaft has a spline on its cylindrical surface opposing the inner surface of said pump drive shaft.

16. An oil pump system in a power train as recited in claim 11, wherein said oil pump is a gear pump including a pump drive gear with an inner portion including a splined central hole, and said one end of said pump drive shaft has a spline by which it couples with the splined central hole.

17. An oil pump system in a power train as recited in claim 11, wherein said sleeve is formed integrally with the casing of said oil pump.

18. An oil pump system in a power train as recited in claim 16, wherein said one end of said pump drive shaft has a shoulder capable of abutting a corresponding surface of the inner portion, the shoulder limiting axial movement of said pump drive shaft.

19. An oil pump system in a power train as recited in claim 12, wherein the outer surface of said other end of said pump drive shaft has a shoulder opposing the second flat and capable of abutting an opposing outer surface of the torque input member, the shoulder limiting axial movement of said pump drive shaft.

* * * * *